May 9, 1933.  C. S. BRAGG ET AL  1,907,491
BRAKE SYSTEM FOR AUTOMOTIVE VEHICLES
Filed May 6, 1930  5 Sheets-Sheet 1
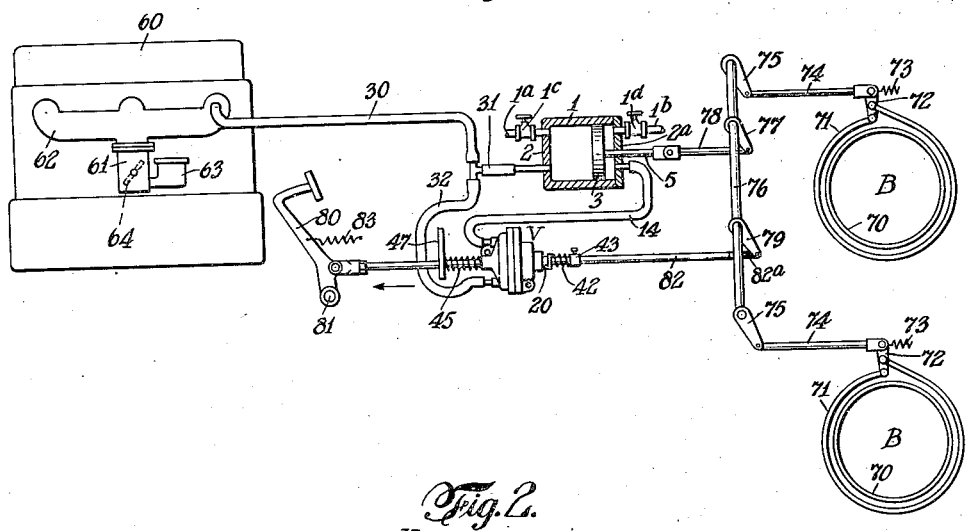

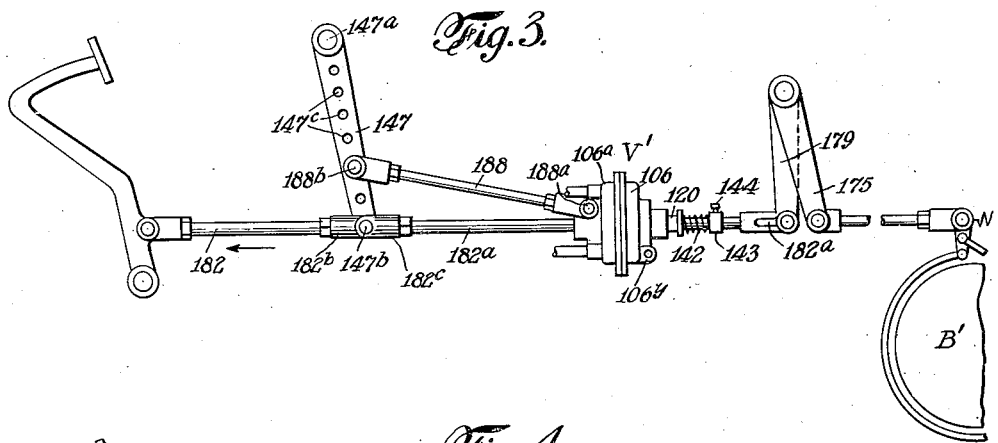
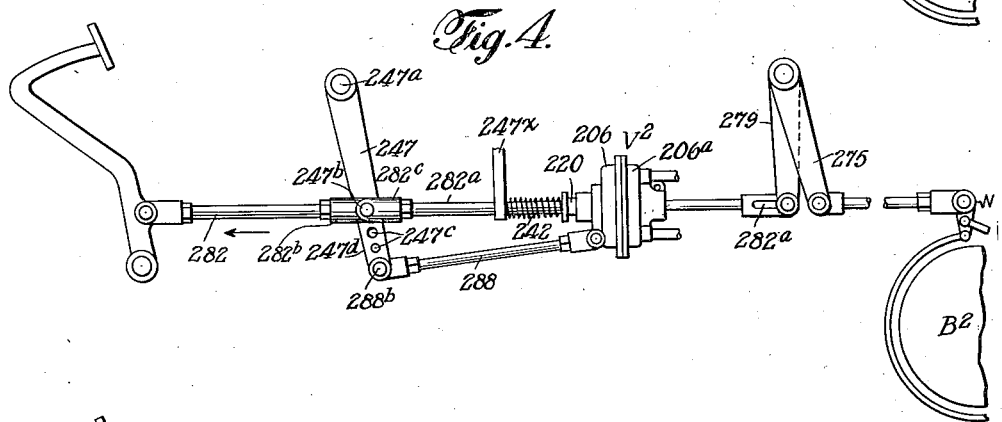
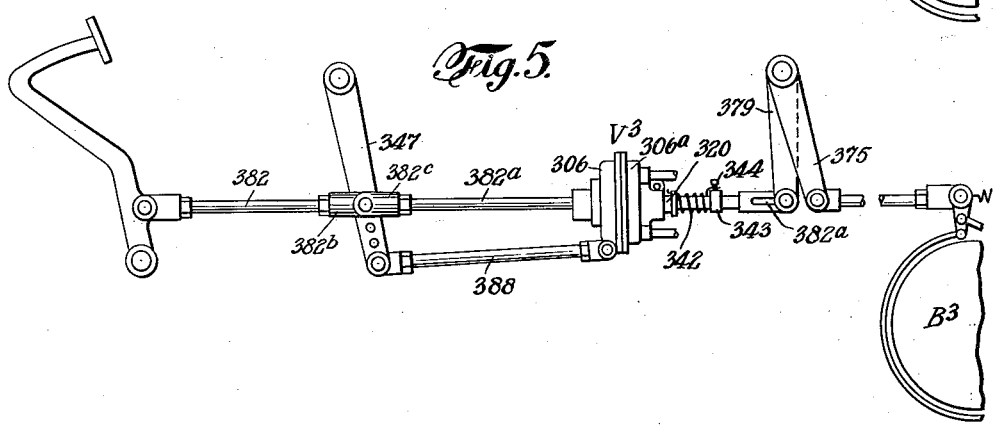

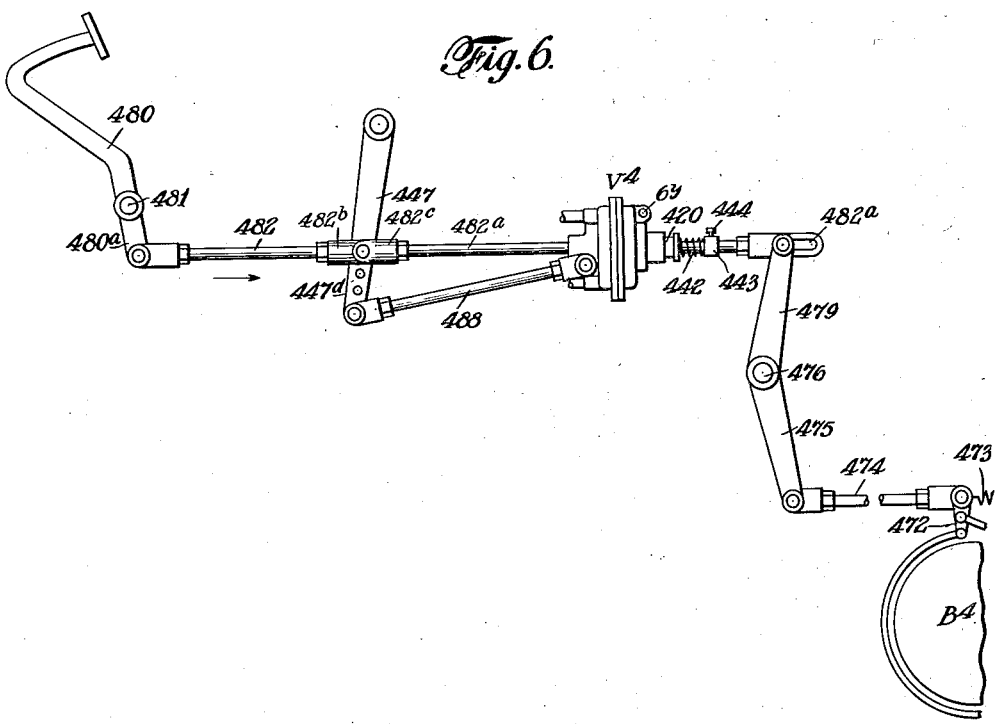
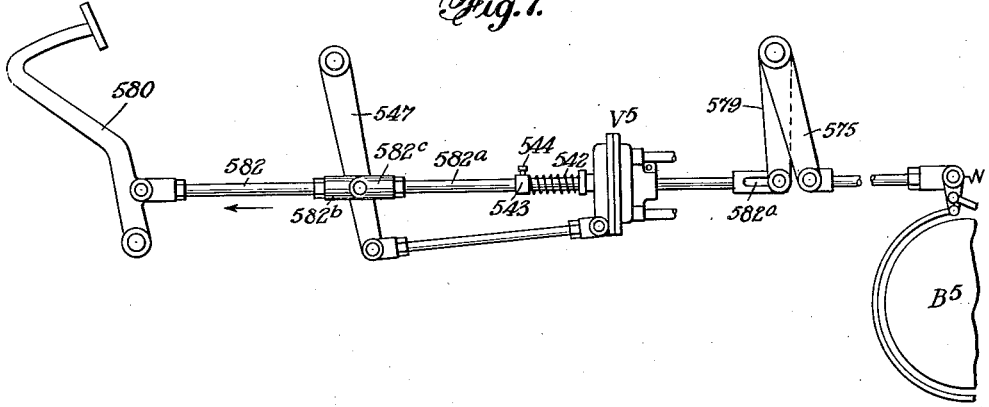

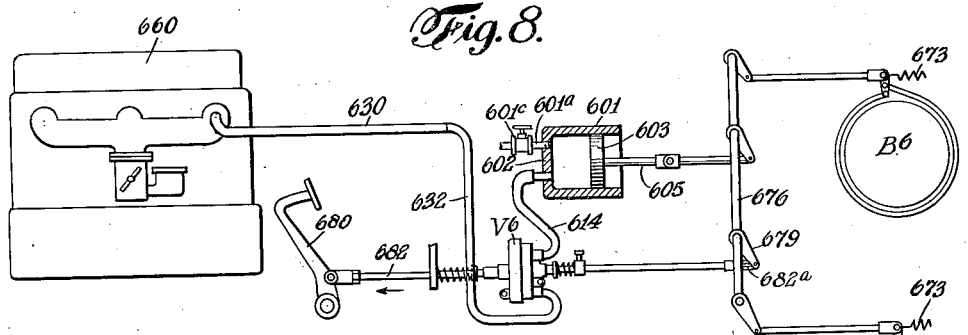
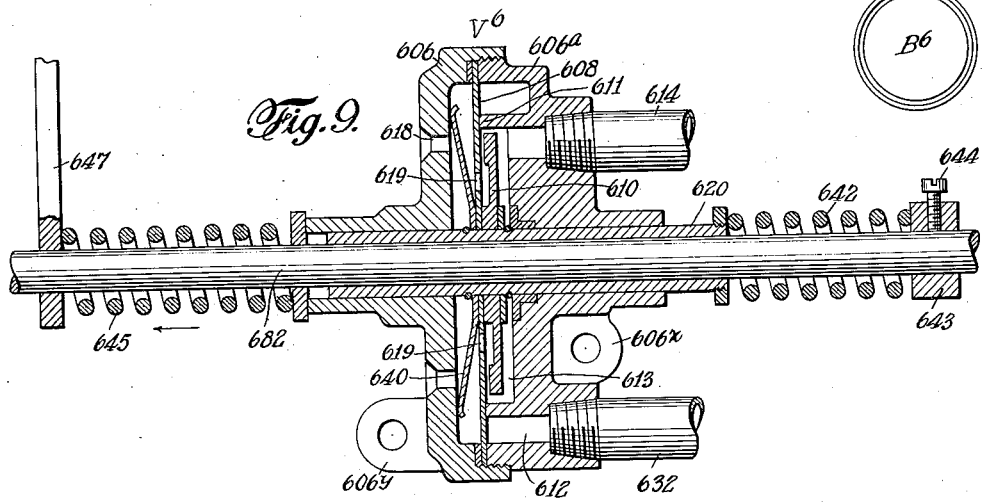
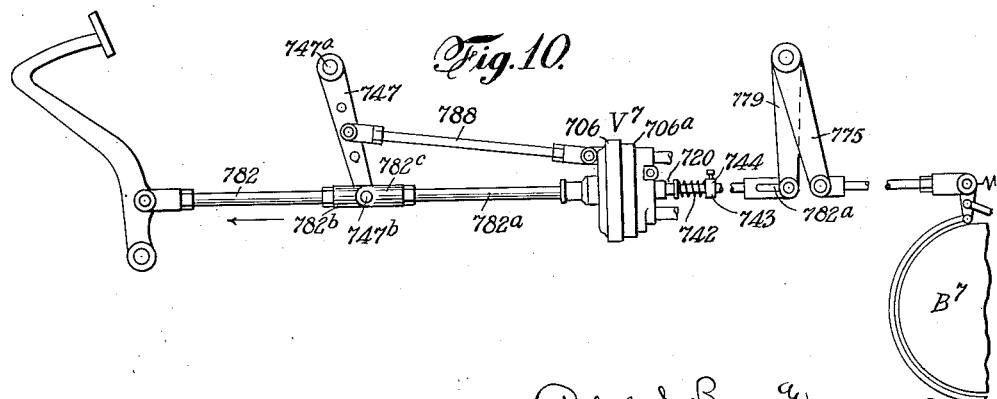

May 9, 1933.  C. S. BRAGG ET AL  1,907,491
BRAKE SYSTEM FOR AUTOMOTIVE VEHICLES
Filed May 6, 1930    5 Sheets-Sheet 5

Patented May 9, 1933

1,907,491

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed May 6, 1930. Serial No. 450,084.

Our invention consists in the novel features hereinafter described, reference being had to the accompanying drawings which show several embodiments of the same selected by us for purposes of illustration, and the said invention is fully disclosed in the following description and claims.

Our invention is an improvement in brake systems for automotive vehicles, and is particularly applicable to vacuum brake systems in which the vacuum or suction is conveniently obtained by means of a suction pipe connected with the suction passage of the internal combustion engine which propels the vehicle, between the throttle valve and the engine cylinders, in which portion of the suction passage a maximum vacuum, represented by substantially 20 inches of mercury on the vacuum gauge, is obtainable at sea level when the throttle valve is closed.

One feature of our invention is the employment of a controlling valve mechanism, preferably of the reactionary type, constructed to be slidably mounted on a portion of the brake linkage or rodding between the physically operable part or brake pedal and brake mechanism, so that it can be applied without the necessity of altering the existing linkage or rodding designed or provided for the vehicle.

Another feature of our invention consists in the operation of a valve so mounted by variation in the tension or compression of a spring or springs also mounted on the brake rod, either by means of a stop carried by and movable with the brake rod, acting in conjunction with a part with respect to which the brake rod has relative movement, and which may be held in fixed relation with the chassis of the vehicle, or in movable relation therewith.

It will be understood that our invention is applicable to systems in which the power actuator, when in the released position, is pressure-balanced, or in other words has its piston exposed to the action of the higher fluid pressure, i. e., atmosphere, on opposite faces, as well as those in which the piston is vacuum-balanced, or in other words exposed on both faces to the lower fluid pressure or vacuum. It will also be understood that the valves may be operated by either tension or compression springs, and that either one or two of such springs may be employed, as hereinafter pointed out.

An important feature of our invention consists in the provision of means hereinafter described in detail, whereby the valve casing may be caused to move relatively with respect to the brake rod, either faster, in which case the relative movement of the valve casing will be in a forward direction, or slower, in which case the relative movement with respect to the brake rod will be rearwardly. It will also be understood that the valve mechanism may be employed to control a power actuator operatively connected to the same brake mechanism to which the linkage from the physically operable part carrying the valve mechanism is connected, in which case the operator is advised by the reaction of the valve as to the time and as to the extent to which such brake mechanism is being applied by power.

Our invention is also applicable to a brake system in which the power actuator controlled by the valve mechanism operates other brake mechanism than that to which the physically operable part is connected. In such case, the operator will be advised by the reaction of the valve of any power application of the other brakes prior to a physical application of the brakes connected with the physically operable part. In other words, the first portion of the movement of the brake pedal, to take up the slack of the brakes directly connected therewith, may operate the valve and cause the power actuator to apply the brakes connected therewith, during which period the reaction of the valve will apprise the operator regarding the time and the extent of any power application of the power brakes, but when the operator is applying the other brakes by his physical force, this warning is unnecessary.

In the accompanying drawings which illustrate several embodiments of our invention selected by us for purposes of illustration, Fig. 1 is a diagrammatic view of a vacuum brake system embodying our present invention, in which the valve mechanism controls a vacuum-balanced power actuator.

Fig. 2 is an enlarged sectional view of the controlling valve mechanism shown in Fig. 1, which is of the reactionary type.

Fig. 3 is a partial diagrammatic view of a slightly modified construction in which one of the movable parts of the valve mechanism, as the valve casing, is connected with a lever also connected with the rodding, so as to produce a relative movement of the valve casing rearwardly with respect to the brake rod when the latter is moved forward, to effect the operation of the valve, a compression spring being shown between the other relatively movable part of the valve mechanism and a stop on the brake rod.

Fig. 4 is a view similar to Fig. 3 showing a modified arrangement of the parts in which the valve casing is moved forwardly relatively to the brake rod, and a compression spring is interposed between the other relatively movable part of the valve mechanism, and a stop fixed to the chassis.

Fig. 5 is a view similar to Fig. 4, except that the spring is interposed between a stop on the brake rod and the other relatively movable part of the valve mechanism.

Fig. 6 is a similar view showing another modification in which the brake rod is operated by a pushing action instead of a pulling action.

Fig. 7 is a view similar to Fig. 4, except that the compression spring is interposed between the valve actuating sleeve and a stop on the brake rod.

Fig. 8 is a view similar to Fig. 1 showing our invention applied to a brake system, including a power actuator of the pressure-balanced type.

Fig. 9 is an enlarged sectional view similar to Fig. 2, showing the valve illustrated in Fig. 8.

Fig. 10 is a view similar to Fig. 3, but illustrating the valve of Figs. 8 and 9.

Figure 11:
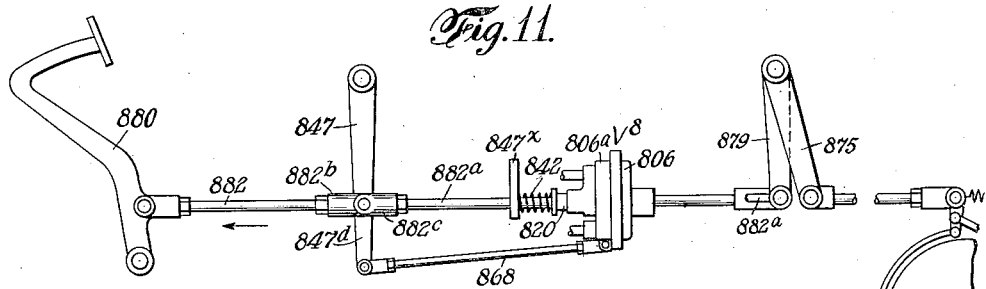
Fig. 11 is a view similar to Fig. 4, showing the valve of Figs. 8 and 9.

Referring to the embodiment of our invention illustrated in Figs. 1 and 2, 1 represents the cylinder of a power actuator mounted on the chassis of the vehicle in any usual or preferred manner, said cylinder being closed at both ends by the heads, 2, 2ª, and provided with the piston, 3, the piston rod, 5, of which is connected with brake mechanisms for the vehicle. These brake mechanisms are indicated at B, B, and may be of any usual or preferred type. For purposes of illustration, we have shown each brake mechanism as comprising a brake drum, 70, a brake band, 71, and brake applying lever, 72, provided with a retracting spring, 73. The brake levers, 72, 72, are connected by links, 74, 74, with arms, 75, 75, on a rock shaft, 76, having an arm, 77, connected in this instance by a link, 78, with the piston rod, 5, of the power actuator.

80 represents the usual pedal lever with which all automotive vehicles are provided, pivoted at 81, to the chassis, and connected, in this instance, at a point between its point of pivoting and the pedal, by a link rod or brake rod, 82, with an arm, 79, on the rock shaft, 76, preferably with a slotted connection 82a to permit the brake pedal to be returned by the springs, 45 and 42, or the regular retracting spring, 83, and so release the power application of brakes as hereinafter described. The pedal is provided with the usual retracting spring, 83.

V represents the controlling valve mechanism for the power actuator, which is preferably of the reactionary type. The specific construction of the valve mechanism per se forms no part of our present invention, as it is covered by our former applications for Letters Patent of the United States, Serial No. 231,724 filed November 7, 1927, and Serial No. 392,004 filed September 12, 1929, and this specific valve mechanism will only be so far described as is necessary for a complete understanding of our present invention. As illustrated in Fig. 2, 6ª represents the main body of the valve casing provided with an annular clamping face, indicated at 7ª, to receive the marginal portions of a flexible diaphragm, 8, which is clamped in sealing engagement with the main body, in this instance by the casing member, 6, secured to the casing member, 6ª, by means of screws, 7ᵇ, and provided with an annular clamping portion, 7, to engage the diaphragm. The main body, 6ª, is provided with an annular seat, 11, within the same, and adapted to engage the diaphragm which, when seated thereon, divides the space within the main body member, 6ª, into an annular suction chamber, 12, and a centrally located chamber, 13. The main body member, 6ª, is provided with a passage, 12ª, for receiving a flexible suction pipe, 32, and connecting it with the annular suction chamber, and said body member is also provided with a similar passage, 13ª, for receiving a flexible pipe connection, 14. The body member, 6ª, is also provided with a central aperture, 6ᵇ, the inner end of which is provided with a sealing device, 6ᶜ, for engaging a longitudinally movable valve actuating sleeve, 20, as hereinafter described.

The diaphragm, 8, is provided with a plurality of higher pressure inlet apertures, indicated at 19, in this instance communicating with the atmosphere through apertures, 18, in the casing member, 6. The diaphragm is also conveniently provided with a reinforcing disc, indicated at 8ª, provided with apertures, 19ª, to register with the apertures, 19, in the diaphragm. 35 indicates a dust cover provided with inlet apertures, 35ª, and preferably containing hair or other fibrous material.

Within the chamber, 13, is a disc valve, 10, provided with an annular seat, 10ª, for engaging the diaphragm, and closing communication between the apertures, 19, and the chamber, 13. The central portions of the diaphragm, reinforcing plate, and disc valve are sealingly connected with the valve actuating part, 20, which in this instance extends through a central aperture in the casing member, 6, and through the sealing member, 6ᶜ, and aperture, 6ᵇ, in the casing member, 6ª. It is unnecessary to provide a sealing member between the sleeve and the casing member, 6, as the suction is confined to the portion of the valve mechanism on the other side of the diaphragm at all times, whether the diaphragm is seated or unseated.

In this instance we have shown a circular series of coil springs, 39, interposed between the disc valve and the casing member, said springs being held in proper position in any suitable manner, as by studs, 40, on a plate, 41, engaging the wall of the chamber, 13, and surrounding the sleeve, 20. These springs hold the valve actuating sleeve at one extreme of movement with a stop, in this instance a collar, 37, forming part of the means for securing the diaphragm and disc valve to the sleeve, 20, in engagement with the casing member, 6, and normally holding the disc valve seated on the diaphragm, and the diaphragm unseated from the seat, 11. These springs constitute a yielding resistance applied in a direction contrary to that in which the valve actuating part, 20, is to be moved by the depression of the pedal, as hereinafter described, and any pressure exerted by these springs would, therefore, necessarily be transmitted to the foot of the operator through the pedal. When the parts are in the released position as shown in Fig. 2, the vacuum chamber, 12, is in communication with the central chamber, 13, and when both of these chambers are exhausted, the pressure of the atmosphere will be exerted on the opposite side of the diaphragm and disc valve. The springs, 39, are so calibrated that their combined resistance is nearly counter-balanced by the maximum differential of fluid pressures existing on the diaphragm and disc valve when the parts are in the released position shown in Fig. 2, and the opposite faces of the diaphragm and disc valve are exposed to vacuum, so that the springs, 39, do not under such circumstances exert any material reaction upon the pedal.

In the diagram Fig. 1, 60 represents the usual internal combustion engine for propelling the vehicle (or vehicles, where the trailer is employed), the engine is shown as provided with a suction passage comprising a vertical portion, 61, and manifold, 62, extending from the carburetor, 63, to the engine cylinders, and provided with the usual throttle valve, indicated at 64. 30 represents a suction pipe connected with the suction passage of the engine, i. e., to the manifold, between the throttle valve and the engine cylinders, and having a branch, 31, connected with the actuator cylinder, 1, forward of the piston, and a flexible branch pipe, 32, which is connected with the suction chamber, 12, of the valve mechanism. The pipe, 14, which communicates with the chamber, 13, of the valve mechanism is connected with the actuator cylinder in rear of the piston, so that when the parts are in released position as shown in Figs. 1 and 2, and the engine is running and the throttle valve closed, the air is exhausted from both ends of the actuator cylinder, and the piston thereof is vacuum-balanced, or in other words submerged in vacuum. It is desirable that the valve mechanism should be capable of being connected operatively with the pedal lever without disturbing or changing the linkage connecting the latter with the brake mechanism, and to this end the sleeve, 20, is provided with a bore of a size to slidingly engage the brake rod, 82, which connects the pedal lever with the brake mechanisms. This enables the valve mechanism to be placed into position by simply uncoupling the rod, 82, and passing it through the sleeve, 20, of the valve mechanism and reconnecting the rod, which will thus support the valve mechanism. In order to operate the valve mechanism, it is necessary to effect a relative movement between the valve actuating sleeve carrying the disc valve, 10, and the diaphragm, 8, and the valve casing, and this may be accomplished in a number of ways. For example in Figs. 1 and 2, we have shown in rear of the valve mechanism a coiled spring, indicated at 42, surrounding the brake rod, 82, and interposed between the valve actuating sleeve, 20, and a collar, 43, adjustably secured to the rod by the set screw, 44. A second coiled spring, 45, is interposed in this instance between a washer, 46, engaging the casing member, 6ª, and a fixed bracket, 47, in this instance secured to a part of the chassis in any desired manner.

In the operation of the brake system, assuming that the engine is running and that the power actuator is vacuum-balanced as before described, if the operator desires to apply the brakes he will place his foot on the pedal and move it forwardly in the direction of the arrow Fig. 1, thereby directly actuating the brake mechanism by his physical force through the brake rod, 82, and rock shaft, 76, in a direction to take up the slack and bring the brake bands into contact with the brake drums and simultaneously compress the springs, 42 and 45, moving the valve, V, in the same direction as the rod, 82. As soon as the compression of springs, 42 and 45, overcomes the slight difference between the force of the resistance springs, 39, in the valve mechanism and the maximum differential of fluid pressures on the diaphragm and disc valve, the springs, 39, will yield. This will permit the valve actuating sleeve, 20, to move in the direction of the arrow Fig. 2 with respect to the valve casing, so as to seat the diaphragm, 8, which cuts off communication between the actuator cylinder in rear of the piston and suction, after which the disc valve, 10, is unseated from the diaphragm, connecting the rear end of cylinder, 1, with the atmosphere. As the pressure builds up in the actuator cylinder in rear of the piston, the piston will begin to exert its power to the brake mechanism with which it is connected. Pressure will correspondingly build up in the chamber, 13, thereby correspondingly diminishing the differential of fluid pressures on opposite sides of the disc valve, 10, and permitting the springs, 39, to exert more of their force upon the disc valve and the valve casing and therethrough to the springs, 42 and 45. As soon as the operator stops the depression of the pedal, intermediate its stroke, the increased effective pressure of the springs, 39, will further compress the springs, 42 and 45, in the manner before described, permitting the disc valve, 10, to seat upon the diaphragm, which remains seated on its seat, 11. This shuts off communication between the rear end of the actuator cylinder and the atmosphere, and the movement of the piston will be arrested. In this way the power of the actuator can be applied gradually and maintained at any point in the stroke of the pedal lever until the actuator is exerting its maximum force, and the operator can then add further physical force directly to the brake mechanisms. When the operator releases the pedal lever, it will be moved rearwardly by the springs, 83, 45 and 42, and as the compression of springs, 45 and 42, on the spring, 39, diminishes, spring, 39, will return the disc valve and diaphragm to the positions shown in Fig. 2 when the cylinder in rear of the piston will be again connected with the suction passage, thereby equalizing pressures on opposite sides of the piston, permitting the brakes and the actuator piston to be returned to the normal or off position by the retracting spring, 73.

The force which the operator must exert to compress the springs, 45 and 42, will apprise the operator of the extent to which the brakes are being applied by power should it be desirable to have the power application take place before the brakes are applied by the physical force of the operator. The force exerted by the operator in compressing springs, 42 and 45, will be lost when such spring or springs are compressed or put under tension against a fixed stop, as in Figs. 1 and 8, but this force is not lost where the stop is movable, as in Figs. 6 and 7. It will be understood that in the operation of the brake mechanism as described, the application of the brakes may be inaugurated by the physical force of the operator and continued by the power actuator or vice versa, depending upon the compression of springs, 45 and 42, in the normal or off position. The exact time at which the actuation of the power actuator begins can be determined by the calibration of the springs, 42 and 45, with respect to the resistance springs, 39, so that the operator can make all slight applications of the brakes by physical force alone if desired, the power actuator being called into operation only when more powerful applications of the brakes are required. On the contrary, by suitable calibrations of the said springs, the actuator may be called into operation almost immediately upon the depression of the pedal lever. Obviously in case of failure of power or when the engine is not running, the operator can always apply the brakes connected with the foot pedal directly by physical force alone through the ordinary pedal lever and brake rod, 82. The brake rod, 82, is preferably connected to the arm, 79, by means of a slotted connection, as indicated at 82ª, so that the foot pedal and valve mechanism will move forwardly as soon as the operator releases his pressure on the pedal, thereby permitting the valve mechanism to release any power application of the brakes. Without this lost motion connection the static friction of the parts might in some instances prevent the rearward movement of the pedal, when released by the operator after the brakes have been applied by power. The slotted connection will also prevent a continued movement of the piston, after the operator ceases the forward movement of his foot from operating the valve mechanism for a full application of the brakes.

In Fig. 2, we have shown the valve casing member, 6ª, provided with a perforated ear, indicated at 6ˣ, and the valve casing member, 6, provided with a perforated ear, 6ʸ, in order that the valve casing may be employed in any one of the several ways illustrated in Figs. 3, 4, 5, 6 and 7.

In Fig. 3 we have illustrated a slight modification of our invention, in which the parts corresponding with those shown in Figs. 1 and 2 are given the same reference numerals with the addition of 100. In this figure we have shown a different means for securing the relative movement between the relative movable parts of the valve mechanism, V¹. Such relative movement is effected by connecting the sections, 182 and 182ᵃ, of the brake rodding, by clevises, 182ᵇ and 182ᶜ, with each other, and with a lever, 147. The lever 147 is pivotally connected with the chassis at 147ᵃ, and to the rod, 182, at 147ᵇ. A link 188 is pivotally connected to lever 147 between its pivotal connections 147ᵃ and 147ᵇ and said link is further connected to the valve casing, the latter being conveniently provided with a perforated ear to receive the pivotal connection, 188ᵃ, at one end of said link, the other end being pivoted at 188ᵇ, in one of a plurality of apertures, 147ᶜ, provided in the lever, 147. The link rod, 182ᵃ, is provided with a stop or collar, and the coiled spring, 142, is located between said stop and the valve actuating sleeve, 120. The other parts are exactly like those shown in Figs. 1 and 2.

It will be seen that when the pedal is depressed, the entire valve, V¹, will be moved by the lever, 147, and link, 188, in the direction of the arrow in Fig. 3, but at a slower rate of speed than the movement of the rod, 182, dependent on the position of the point of connection between the link, 188, and lever, 147. This differential movement of the valve and rod results in effecting the operation of the valve mechanism, and bringing the power actuator into operation exactly as previously described. The exact point in the stroke of the pedal lever at which the power actuator is called into operation can be determined by the calibration of the spring, 142, as previously described, or by adjusting the forward end of the link, 188, with respect to the lever, 147. In this instance the spring, 142, is a compression spring like the spring, 42, in Figs. 1 and 2, and the spring, 45, shown in those figures, and the stationary bracket, 47, are dispensed with.

In Fig. 4, in which the parts corresponding with those shown in Figs. 1 and 2 are given the same reference numerals with the addition of 200, we have shown a further modification of our invention in which the valve mechanism, V², is moved in the same direction but at a greater rate of speed than the brake rod, 282, so as to produce a relative movement of the valve casing in a forward direction with respect to the brake rod. This movement of the valve casing at greater speed than the brake rod is effected by extending the lever, indicated at 247, beyond its pivotal connection, 247ᵇ, with the brake rod, as indicated at 247ᵈ, forming an extension, which is preferably provided with a series of adjusting apertures, 247ᵉ, to receive the pivotal connection, 288ᵇ. The valve mechanism, V², is placed in sliding engagement with the brake rod, 282, in a position the reverse of that in which it is shown in Figs. 1, 2 and 3, so that the valve actuating sleeve, indicated at 220 extends forwardly from the valve casing, and the rear end of the link, 288, is connected to an ear on the valve casing member, 206, adjacent to the dust cap. The valve casing will be moved forward in the direction of the arrow in Fig. 4, for the reason that the outer end of the lever, 247, travels faster than the point, 247ᵇ, therein, of its connection with the brake rod, and the operation of the valve is effected in this instance by interposing a compression spring, 242, between the valve actuating sleeve, 220, and the bracket, 247ˣ, secured to the chassis. The operation of the valve in controlling the power actuator will be the same as previously described.

It will be understood that while we have shown compression springs in the preceding figures for actuating the valve mechanism as at 42, 142 and 242, the same result can be obtained by the use of a tension spring properly connected to one of the relatively movable parts of the valve mechanism. Thus in Fig. 5, in which the parts corresponding to those shown in Figs. 1 and 2 are given the same reference numerals with the addition of 300, we have shown a construction similar to Fig. 4, in which the valve mechanism, V³, is disposed slidably on the brake rod, 382a, in the same manner as in that figure, but in this case the valve sleeve, indicated at 320, has the opposite end projecting from the casing member, 306ᵃ, instead of from the member, 306, and said sleeve is connected by a tension spring, indicated at 342, with a collar, 343, secured on the brake rod by the set screw, 344. In this construction the relative movement of the valve, V³, forwardly with respect to the brake rod, accomplished through the lever, 347, and link, 388, will effect the necessary relative movement between the sleeve, 320, and the valve casing in the same direction as in Fig. 4, and the operation of the parts will be exactly the same as that previously described.

In the preceding figures the pedal lever has been shown so connected with the brake rod as to effect a pulling action when the pedal was depressed, but it will be understood that our invention is equally applicable to a construction in which the brake rod is operated by a pushing action, which may be in some instances desirable. Thus in Fig. 6, in which the parts corresponding with those shown in Figs. 1 and 2 are given the same reference numerals with the addition of 400, the pedal lever, 480, is provided with a depending portion, 480ᵉ, below its point of pivoting, 181, to which the brake rod, 482, is connected, the other end of the brake rod being shown connected with an upwardly extending arm, 479, on the rock shaft, 476, in order to impart the desired movement to the brake applying lever, 472. In this instance the valve mechanism, indicated at V⁴, is slidably mounted on the brake rod, 482, in the same position which it occupies in Fig. 3 for example, but the lever, 447, is provided with a downwardly extending projection, 447ᵇ, connected by link, 488, with the valve casing, so as to move the valve mechanism rearwardly at a higher rate of speed than the brake rod. In this instance a compression spring, 442, is shown engaging the projecting portion of the sleeve, 420, and located on the brake rod between said sleeve and the collar, 443, secured to the brake rod. The operation will be the same as that previously described.

In Fig. 7, in which the parts corresponding with those shown in Figs. 1 and 2 are given the same reference numerals with the addition of 500, we have illustrated a construction like that shown in Fig. 4, except that the forward end of the compression spring, 542, engages a collar, 543, secured to the brake rod, instead of engaging a fixed part connected with the chassis, as shown in Fig. 4.

In Figs. 8 and 9, in which the parts corresponding with those shown in Figs. 1 and 2 are given the same reference numerals with the addition of 600, we have illustrated a brake system in all respects similar in operation to that previously described with reference to Figs. 1 and 2, except that the power actuator is of the pressure-balanced type, and the valve mechanism, indicated at V⁶, is necessarily modified so as to properly control a pressure-balanced actuator. As shown, the cylinder of the actuator, 601, is closed at one end at 602, and is opened to the atmosphere at the other end, so that the outer face of the piston is always exposed to atmospheric pressure. The specific valve mechanism shown in detail in Fig. 9 forms no part of our present invention, as it is covered by our former application, Serial No. 231,724, and will be only briefly described herein. It comprises the casing members, 606 and 606ᵃ, the diaphragm, 608, disc valve, 610, carried by the valve actuating sleeve, 620, and the pipe connections are as previously described with respect to the valve shown in Fig. 2. In the normal position of this valve, however, the diaphragm is held seated upon the seat, 611, and the disc valve is held unseated, by a spring, 640, in this instance in the form of a spring spider, so that the actuator cylinder, 601, is connected by pipe, 614, chamber, 613, diaphragm apertures, 619, and the aperture, 618, in the casing member, 606, with the atmosphere. Both faces of the piston are, therefore, subjected to atmospheric pressure in this position of the valve mechanism, that is to say, the piston is pressure-balanced when in the released position. On a movement of the valve sleeve, 620, in the direction of the arrows in Figs. 8 and 9, the disc valve will be seated on the diaphragm, after which the diaphragm will be unseated, so as to connect the chamber, 613, and the actuator cylinder forward of the piston with the suction chamber, 612, which will effect an application of the brakes by power when suction exists in the manifold. A movement of the valve sleeve in the opposite direction will first seat the diaphragm without unseating the disc valve and hold the brakes as applied, and a further movement in the reverse direction will unseat the disc valve, reconnecting the actuator cylinder with atmosphere, admitting air to equalize pressures on the piston, and permit the release of the brakes and the retraction of the brakes and actuator piston by the springs, 673.

In Fig. 9 we have shown the valve sleeve projecting from the valve casing at the rear end, and the members of the valve casing provided with attaching ears, 606ˣ and 606ʸ, so that it can be arranged in any of the various ways in which the valve of Fig. 2 is shown, in the preceding figures.

In Figs. 8 and 9, the valve, V⁶, is shown installed in the same manner as the valve, V, in Fig. 1, that is to say, a compression spring, 642, is interposed between the rear end of the valve actuating sleeve, 620, and the collar, 643, secured to the brake rod, 682, a compression spring, 645, being interposed between the front end of the valve casing and a fixed part, 647, secured to the chassis. In the operation of the brake system as shown in Figs. 8 and 9, assuming that the engine is running, the suction pipe, 630, 632, will be evacuated, together with the annular suction chamber, 612. If it is desired to effect an application of the brake mechanisms, indicated at B⁶, B⁶, in Fig. 8, the operator will depress the brake pedal lever, 680, in the usual manner, which will cause a movement of the brake rod, 682, in the direction of the arrow Figs. 8 and 9, which will rotate the rock shaft, 676, in the direction to apply the brakes. A forward movement of the brake rod, 682, will tend to compress the springs, 642 and 645, between the collar, 643, and a stop, 647. As soon as the pressure of these springs on the casing and valve sleeve in opposite directions is sufficient to overcome the tension of the spring, 640, within the valve casing, the relative movement between the valve casing and the sleeve, 620, will occur, the sleeve, 620, moving forward with respect to the valve casing and first seating the disc valve, 610, on the diaphragm, to close off communication between the actuator cylinder and the atmosphere, and thereafter unseating the diaphragm when the differential of fluid pressures on that portion of the diaphragm which seals the suction chamber, 612, is overcome by the springs, and connecting the cylinder with vacuum. Air will at once be exhausted from the cylinder, 601, forward of the piston, effecting a forward movement of the piston, 603, and applying the brakes by power. This will result in producing an increasing partial vacuum on the right side of the diaphragm, 608, and the disc valve, 610, producing a differential of fluid pressures transmitted to the valve sleeve, and tending to force it rearwardly. A corresponding differential of fluid pressures will be produced on opposite faces of the rear wall of the casing member, 606$^a$, tending to move the casing forwardly. If the operator stops the depression of the pedal intermediate its stroke, these differentials of fluid pressures, as soon as they are sufficient to overcome the compression of the springs, 645 and 642, as then compressed, will effect the seating of the diaphragm and stop the movement of the piston without unseating the disc valve. A further depression of the pedal, resulting in a further compression of the springs, 642 and 645, will again unseat the diaphragm, and the further evacuation of the cylinder, 601, will apply additional power from the actuator to the brake mechanism. In this manner the power of the actuator can be applied gradually and arrested in any point in the stroke of the pedal lever until the full power of the actuator is exerted, after which the operator can add more of his physical force to the brake mechanisms, if desired. When the pedal lever is released, the spring, 642, will be relaxed, permitting the differential of fluid pressures on the diaphragm and disc valve to seat the diaphragm and unseat the disc valve, admitting air to the actuator cylinder forward of the piston and equalizing pressures in the actuator, thus permitting the brake mechanisms to be immediately released, and the piston and brake mechanisms to be returned to released position under the action of their springs, 673. The operation is substantially identical with that previously described with reference to Figs. 1 and 2, except that the power actuator is of the pressure operated type.

It is obvious that the compression of springs, 642 and 645, will apprise the operator as to the extent to which the power of the actuator is applied to the brake mechanisms.

In Fig. 10 we have shown a slight modification of the apparatus shown in Figs. 8 and 9, in which figure the parts corresponding with those shown in Figs. 1 and 2 are given the same reference numerals with the addition of 700. In this figure we have shown the valve mechanism, indicated at V$^7$, which is of the type shown in Fig. 9, slidingly mounted on the brake rod, 782, in the same position as that shown in Figs. 8 and 9, and the valve sleeve, 720, projecting from the valve casing member, 706$^a$, engaging a compression spring, 742, interposed between the valve sleeve and the collar, 743, on the brake rod. In this case the relative movement between the valve mechanism and the brake rod is effected by link, 788, connected to the casing member, 706, at one end, and at the other end to a lever, 747, pivoted to the chassis at one end and at the other end pivoted to the brake rod in the manner shown in and described with respect to Fig. 3. In this construction, the forward movement of the brake rod, 782, in the direction of the arrow Fig. 10, will effect a movement of the valve mechanism on the brake rod, as the rate of speed at which the valve mechanism travels will be slower than that of the brake rod itself, and the valve mechanism will operate in the manner previously described with reference to Figs. 8 and 9.

In Fig. 11 we have illustrated another modification, in which the parts corresponding with those shown in Figs. 1 and 2 are given the same reference numerals with the addition of 800. In this instance the valve mechanism, V$^8$, of the type shown in Fig. 9, is slidingly mounted on the brake rod, 882, in a reverse position to that in which it is shown in Fig. 9, and the valve casing is connected by link, 868, with a projecting portion, 847$^d$, of the lever, 847, beyond the connection therewith of the brake rod, 882, so that when the pedal lever is operated, the valve mechanism will move at a greater rate of speed than the brake rod, effecting a forward movement of the valve mechanism with respect to the brake rod. In this instance a compression spring, 842, is interposed between the valve actuating sleeve, 820, and a fixed part, 847$^x$, secured to the chassis, in a manner similar to the construction illustrated in Fig. 4.

Figure 12:
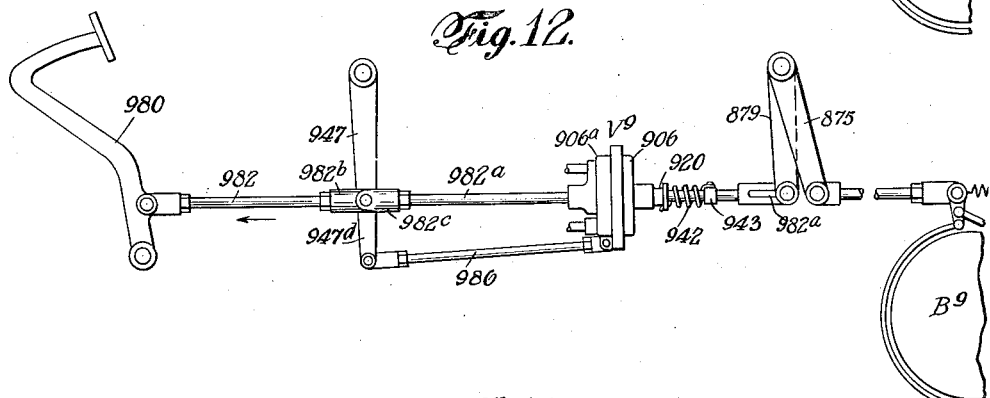
Fig. 12 is a view similar to Fig. 5, showing the valve of Figs. 8 and 9.

In Fig. 12, in which the parts corresponding with those in Figs. 1 and 2 are given the same reference numerals with the addition of 900, the construction is the same as that shown in Fig. 11, except that the valve actuating sleeve, 920, projects from the opposite end of the valve casing, that is, beyond the casing member, 906, and is connected by a tension spring, 942, with a stop, 943.

Figure 13:
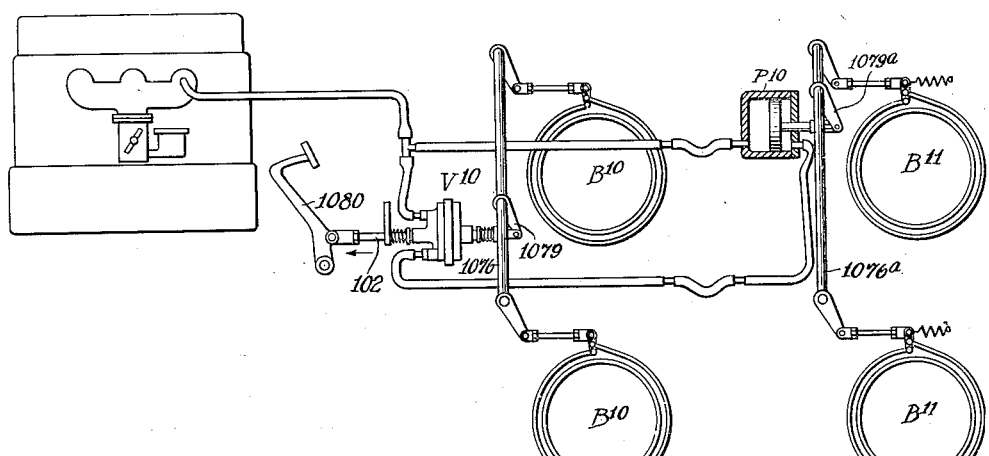
Fig. 13 is a diagram similar to Figs. 1 and 8, showing a vacuum-balanced actuator operatively connected with one brake mechanism and controlled by a valve mechanism supported on the linkage between the brake pedal and another brake mechanism.

In Fig. 13, in which the parts corresponding with those in Figs. 1 and 2 are given the same reference numerals with the addition of 1000, we have illustrated a brake system which is practically identical with that shown in Figs. 1 and 2, except that in this case the power actuator, P$^{10}$, is connected with a rock shaft, 1076$^a$, operatively connected with brake mechanisms, B$^{11}$, B$^{11}$, having no connection with the pedal lever, and the valve mechanism for controlling the actuator is located in the linkage between the pedal lever and other brake mechanisms, indicated at $B^{10}$, $B^{10}$, which are in this instance connected with the rock shaft, 1076, provided with an arm, 1079, to which the brake rod, 1082, from the pedal lever, 1080, is connected. The valve mechanism, $V^{10}$, which in this instance is of the type shown in Fig. 2, is slidingly mounted on the brake rod, 1082, and operates in the manner previously described with reference to Figs. 1 and 2. In this construction, as previously stated, the compression of the springs, 1045 and 1042, required to overcome the reactionary force of the valve mechanism will apprise the driver of the extent to which the brakes, $B^{11}$, are being applied by power unless or until the effort to apply the brakes, $B^{10}$, connected with the pedal lever exceeds the reactionary force of the valve. In other words, the first movement of the brake pedal to take up the slack of the brakes, $B^{10}$, $B^{10}$, with which it is directly connected, may cause the operation of the valve mechanism and start the operation of the power actuator, but as soon as the operator applies force to the brakes, $B^{10}$, in excess of the reactionary force of the valve, he will not be conscious of the said reactionary force, and warning thereby will be unnecessary.

What we claim and desire to secure by Letters Patent is:

1. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of the said rodding and supported thereby, and capable at all times of movement longitudinally thereof, said valve mechanism having relatively movable parts, and means for effecting a relative movement of the relatively movable parts of said valve mechanism by the longitudinal movement of said rodding.

2. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of the said rodding and supported thereby, and capable at all times of movement longitudinally thereof, said valve mechanism having relatively movable parts, a part fixed to said rodding operatively connected with one of said valve parts, and a part with respect to which said rodding is relatively movable, operatively connected to the other of said valve parts.

3. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of the said rodding and supported thereby, and capable at all times of movement longitudinally thereof, said valve mechanism having relatively movable parts, a part fixed to said rodding, a connection from said fixed part to one of said valve parts, a part with respect to which the rodding is relatively movable, a connection from said last mentioned part to the other of said valve parts, one of said connections including a spring.

4. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of the said rodding and supported thereby, and capable at all times of movement longitudinally thereof, said valve mechanism having relatively movable parts, a part fixed to said rodding, a connection from said fixed part to one of said valve parts, a second part with respect to which the rodding is relatively movable, said last mentioned part having a connection with a fixed part of the vehicle, and a connection from said second part to the other of said relatively movable valve parts.

5. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding, a connection from said fixed part to one of said valve parts, a second part with respect to which the rodding is relatively movable, said last mentioned part having a connection with a fixed part of the vehicle, and a connection from said second part to the other of said relatively movable valve parts, one of said connections including a spring.

6. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding and operatively connected with one of said valve parts, a second part having a pivotal connection with said rodding for operating it by a movement of the rodding, and operative connections from said second part to the other of said valve parts for moving the latter with respect to the rodding when the rodding is moved longitudinally.

7. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding, a spring interposed between said part and one of said valve parts, a lever connected with said rodding, and operative connections from said lever to the other of said valve parts for moving the latter with respect to the rodding when the rodding is moved longitudinally.

8. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding, connections from said part to one of said valve parts, a lever pivoted at a fixed point on the vehicle, and having an engagement with said rodding, and a link connecting said lever at a point at a distance from its connection with said rodding and connected to the other of said valve parts for effecting a movement of the latter with respect to the rodding when the rodding is moved longitudinally.

9. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to the rodding, a spring interposed between said part and one of the relatively movable parts of the valve mechanism, a lever pivoted at a fixed point and having an engagement with said rodding, and a link pivotally connected to said lever at a point at a distance from its connection with the rodding, and pivotally connected to the other of said relatively movable parts for effecting a movement of the latter relatively to said rodding by longitudinal movement of said rodding.

10. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding and operatively connected with one of said valve parts, a second part having a pivotal connection with said rodding for operating it by movement of the rodding, and operative connections from said second part to the other of said valve parts for moving the latter in the same direction as the longitudinal movement of the rodding but at a different rate of speed, to effect relative movement between said relatively movable valve parts.

11. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding, a spring interposed between said part and one of said valve parts, a lever connected with said rodding and operative connections from said lever to the other of said valve parts for moving the latter in the same direction as the longitudinal movement of the rodding, but at a different rate of speed, to effect relative movement between the relatively movable valve parts.

12. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding, connections from said part to one of said valve parts, a lever pivoted at a fixed point on the vehicle, and having an engagement with said rodding, and a link connecting said lever at a point at a distance from its connection with said rodding and connected to the other of said valve parts for effecting a movement of the latter in the same direction as the longitudinal movement of the rodding, but at a different rate of speed, to effect a relative movement of the relatively movable parts.

13. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to the rodding, a spring interposed between said part and one of the relatively movable parts of the valve mechanism, a lever pivoted at a fixed point and having an engagement with said rodding, and a link pivotally connected to said lever at a point at a distance from its connection with the rodding, and pivotally connected to the other of said relatively movable parts, for effecting a movement of the latter in the same direction as the longitudinal movement of the rodding but at a different rate of speed to effect a relative movement of the relatively movable parts.

14. In a brake system for automotive vehicles, the combination with brake mechanisms, a physically operable part, and rodding connecting it with certain of said brake mechanisms of a power actuator connected with certain of said brake mechanisms, a controlling valve mechanism for said actuator supported by a portion of said rodding and capable of movement longitudinally thereof at all times, and means effecting the operation of said valve mechanism by the longitudinal movement of said rodding, and means for providing said valve mechanism with a reactionary force proportionate to the varying differential of fluid pressures in the actuator, and transmitted through said rodding to the physically operable part.

15. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of the said rodding and supported thereby, and capable at all times of movement longitudinally thereof, said valve mechanism having relatively movable parts, and means for effecting a relative movement of the relatively movable parts of said valve mechanism by the longitudinal movement of said rodding, said valve mechanism having parts exposed to a differential of fluid pressures corresponding to that in the power actuator during a power stroke thereof, and providing a reactionary force transmitted through said rodding to the physically operable part.

16. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, and means for effecting a relative movement of the relatively movable parts of said valve mechanism by the longitudinal movement of said rodding, said valve mechanism having parts exposed during a power stroke of the actuator to a differential of fluid pressures corresponding with that in the actuator, and transmitted through said rodding to the physically operable part.

17. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding, a connection from said fixed part to one of said valve parts, a part with respect to which the rodding is relatively movable, a connection from said last mentioned part to the other of said valve parts, one of said connections including a spring, and means for providing said valve mechanism with a reactionary force proportionate to the varying differential of fluid pressures in the actuator, and transmitted through said rodding to the physically operable part.

18. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding and operatively connected with one of said valve parts, a second part having a pivotal connection with said rodding for operating it by a movement of the rodding, and operative connections from said second part to the other of said valve parts for moving the latter with respect to the rodding when the rodding is moved longitudinally, and means for providing said valve mechanism with a reactionary force proportionate to the varying differential of fluid pressures in the actuator, and transmitted through said rodding to the physically operable part.

19. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding, connections from said part to one of said valve parts, a lever pivoted at a fixed point on the vehicle, and having an engagement with said rodding, and a link connecting said lever at a point at a distance from its connection with said rodding and connected to the other of said valve parts for effecting a movement of the latter with respect to the rodding when the rodding is moved longitudinally, and means for providing said valve mechanism with a reactionary force proportionate to the varying differential of fluid pressures in the actuator, and transmitted through said rodding to the physically operable part.

20. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator having a sliding engagement with a portion of said rodding and supported thereby, and capable at all times of movement longitudinally thereof, said valve mechanism having relatively movable parts, a part fixed to said rodding and operatively connected with one of said valve parts, a second part having a pivotal connection with said rodding for operating it by movement of the rodding, and operative connections from said second part to the other of said valve parts for moving the latter in the same direction as the longitudinal movement of the rodding but at a different rate of speed, to effect relative movement between said relatively movable valve parts, and means for providing said valve mechanism with a reactionary force proportionate to the varying differential of fluid pressures in the actuator, and transmitted through said rodding to the physically operable part.

21. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator, supported by a portion of the rodding, and capable of movement longitudinally thereof at all times, said valve mechanism comprising a valve casing, a valve actuating sleeve, movable with respect to the casing and having a sliding engagement with said rodding, and valve means within said casing operated by the relative movement of the casing and sleeve, and means for effecting said relative movement by a longitudinal movement of the rodding.

22. In a brake system for automotive vehicles, the combination with brake mechanisms, a physically operable part, and rodding connecting it with certain of said brake mechanisms of a power actuator connected with certain of said brake mechanisms, a controlling valve mechanism for said actuator comprising a valve casing provided with a relatively movable valve actuating sleeve having a sliding engagement therewith, and valve means connected with said sleeve and operated by the relative movement of said valve and casing, said sleeve having a sliding engagement with a portion of said rodding, and said sleeve and casing being movable with respect to said rodding and with respect to each other at all times, said valve mechanism having portions exposed during the power stroke of the actuator to the differential of fluid pressures therein, and means for effecting a relative movement between said valve and valve casing by a longitudinal movement of the rodding by said physically operable part.

23. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator comprising a valve casing provided with a relatively movable valve actuating sleeve having a sliding engagement therewith, and valve means connected with said sleeve and operated by the relative movement of said valve and casing, said sleeve having a sliding engagement with a portion of said rodding, and said sleeve and casing being movable with respect to said rodding and with respect to each other at all times, said valve mechanism having portions exposed during the power stroke of the actuator to the differential or fluid pressures therein, a fixed part on said rodding, and a part connected with a fixed portion of the vehicle, and connections from said parts respectively to said valve casing and sleeve.

24. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator comprising a valve casing provided with a relatively movable valve actuating sleeve having a sliding engagement therewith, and valve means connected with said sleeve and operated by the relative movement of said valve and casing, said sleeve having a sliding engagement with a portion of said rodding, and said sleeve and casing being movable with respect to said rodding and with respect to each other at all times, said valve mechanism having portions exposed during the power stroke of the actuator to the differential of fluid pressures therein, a fixed part on said rodding, and a part connected with a fixed portion of the vehicle, connections from said parts respectively to said valve casing and said sleeve, and a spring interposed in at least one of said connections.

25. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator comprising a valve casing provided with a relatively movable valve actuating sleeve having a sliding engagement therewith, and valve means connected with said sleeve and operated by the relative movement of said valve and casing, said sleeve having a sliding engagement with a portion of said rodding, and said sleeve and casing being movable with respect to said rodding and with respect to each other at all times, said valve mechanism having portions exposed during the power stroke of the actuator to the differential of fluid pressures therein, a lever pivoted to a fixed part of the vehicle and operatively connected with the said rodding, a connection from said lever to one of the relatively movable parts of said valve mechanism, and yielding means operatively engaging the other of said relatively movable parts.

26. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator comprising a valve casing provided with a relatively movable valve actuating sleeve having a sliding engagement therewith, and valve means connected with said sleeve and operated by the relative movement of said valve and casing, said sleeve having a sliding engagement with a portion of said rodding, and said sleeve and casing being movable with respect to said rodding and with respect to each other at all times, said valve mechanism having portions exposed during the power stroke of the actuator to the differential of fluid pressures therein, a lever pivoted to a fixed part of the vehicle and operatively connected with said rodding, a connection from said lever to the said valve casing, and yielding means operatively engaging said sleeve, to resist relative movement thereof with respect to the valve casing.

27. In a brake system for automotive vehicles, the combination with brake mechanisms, a physically operable part, and rodding connecting it with certain of said brake mechanisms, of a power actuator connected with certain of said brake mechanisms, a controlling valve mechanism for said actuator comprising a valve casing provided with a relatively movable valve actuating sleeve having a sliding engagement therewith, and valve means connected with said sleeve and operated by the relative movement of said valve and casing, said sleeve having a sliding engagement with a portion of said rodding, and said sleeve and casing being movable with respect to said rodding and with respect to each other at all times, said valve mechanism having portions exposed during the power stroke of the actuator to the differential of fluid pressures therein, a lever pivoted to a fixed part of the vehicle and operatively connected with said rodding, a connection from said lever to the said valve casing for moving it in the same direction as the longitudinal movement of the rodding but at a different rate of speed, and a spring operatively engaging said sleeve.

28. In a brake system for automotive vehicles, the combination with brake mechanisms, a physically operable part and rodding connecting it with certain of said brake mechanisms, of a power actuator connected with other brake mechanisms not connected with said rodding, a controlling valve mechanism for the actuator, supported by and slidably mounted on the said rodding between the physically operable part and the brake mechanism connected therewith, said valve mechanism comprising relatively movable parts, and means for effecting relative movement of said valve parts by the longitudinal movement of said rodding.

29. In a brake system for automotive vehicles, the combination with brake mechanisms, a physically operable part and rodding connecting it with certain of said brake mechanisms, of a power actuator connected with other brake mechanisms not connected with said rodding, a controlling valve mechanism for the actuator, supported by and slidably mounted on the said rodding between the physically operable part and the brake mechanism connected therewith, said valve mechanism comprising relatively movable parts, and means including a spring operatively engaging one of said valve parts for effecting relative movement of said parts by the longitudinal movement of said rodding.

30. In a brake system for automotive vehicles, the combination with a brake mechanism, a physically operable part, and linkage connecting said part with said brake mechanism, of a power actuator connected with said brake mechanism, a controlling valve mechanism for said actuator mounted on and supported by said linkage, said valve mechanism having relatively movable parts, a lever member operably connected to said linkage, a connection between one of the relatively movable parts of the valve and said lever and another connection, constituting a part of said linkage, interconnecting said lever and another valve part.

31. In a brake system for automotive vehicles, the combination with a brake mechanism, a physically operable part, and linkage connecting said part with said brake mechanism, of a power actuator connected with said brake mechanism, a controlling valve mechanism for said actuator having relatively movable parts, said parts being mounted on and supported by said linkage, a lever member operatively connected to said linkage, a connection between one of the relatively movable parts of the valve and said lever and another connection, constituting a part of said linkage, interconnecting said lever and another valve part, the points of connection between said physically operable part, lever, valve parts and the aforementioned connections being such as to insure simultaneous movement of both valve parts as the physically operable part is actuated to operate the valve to apply the brakes by power.

32. A brake system for automotive vehicles comprising in combination with a brake mechanism to be operated, a power actuator operatively connected to said brake mechanism, a manually operable member, a valve member for controlling the operation of said power actuator, said valve member comprising a spring operative to maintain the valve in its closed or inoperative position, a lever member, connections interconnecting the aforementioned parts and including parts interconnecting said lever member with the parts of said valve member, said aforementioned manually operable member, valve, lever and connections being so constructed and arranged as to insure an operation of the valve, against the action of its spring, with the operation of the manually operable member to thereby activate the power actuator and apply the brake mechanism by power.

In testimony whereof we affix our signatures.

CALEB S. BRAGG.
VICTOR W. KLIESRATH.